United States Patent [19]
Atsumi et al.

[11] Patent Number: 5,276,439
[45] Date of Patent: Jan. 4, 1994

[54] DIGITAL SIGNAL EXCHANGE EQUIPMENT

[75] Inventors: Takehiko Atsumi, Ichikawa; Hiroyuki Ibe, Yokohama; Taro Shibagaki, Tokyo; Takeshi Ozeki, Kawaguchi, all of Japan

[73] Assignee: Kabushiki Kaisha Toshiba, Kawasaki, Japan

[21] Appl. No.: 969,519

[22] Filed: Oct. 30, 1992

Related U.S. Application Data

[63] Continuation of Ser. No. 793,508, Nov. 18, 1991, abandoned, which is a continuation of Ser. No. 353,769, May 18, 1989, abandoned.

[30] Foreign Application Priority Data

May 23, 1988 [JP] Japan ............................. 63-125124
May 23, 1988 [JP] Japan ............................. 63-125125

[51] Int. Cl.$^5$ ............................................. H04B 3/38
[52] U.S. Cl. ................................. 340/825; 340/826
[58] Field of Search .................. 340/825.79–825.96, 826, 825; 307/465, 466, 467, 255, 254, 262, 253, 254, 239, 270; 329/306; 370/53; 328/104

[56] References Cited

U.S. PATENT DOCUMENTS

| | | | |
|---|---|---|---|
| 2,707,591 | 5/1955 | May | 340/825.87 |
| 3,614,327 | 10/1971 | Low et al. | 328/104 X |
| 4,345,251 | 8/1982 | Begeman et al. | 340/825.86 |
| 4,566,007 | 1/1986 | Richards | 340/825.79 X |
| 4,803,486 | 2/1989 | Sano et al. | 340/825.79 |
| 4,847,612 | 7/1989 | Kaplinsky | 340/825.8 |

FOREIGN PATENT DOCUMENTS 0006816 1/1980 European Pat. Off. .
0165499 12/1985 European Pat. Off. .

OTHER PUBLICATIONS

Proceedings of the International Switching Symposium, May 7–11, 1984, Session 23-C, Paper 1, pp. 1–7, H. Bauch, et al., "Architectural and Technology Aspects of Broadband Switching".
NTG-Fachberichte, Mar. 25–27, 1985, pp. 202–209, K. D. Langer, et al., "Konzeption und Realisierung Eines Breitband-Koppelnetzes fur 70MBits/S".
IBM Technical Disclosure Bulletin, vol. 24, No. 3, Aug. 1981, pp. 1761–1762, S. C. Sullizan, et al., "High Density Multiplexed Polarity Hold Latch".
Patent Abstracts of Japan, vol. 12, No. 111(E-598) {2958}, Apr. 8, 1988, & JP-A-62-239699, Oct. 20, 1987, T. Shimoe, et al., "High Speed Highway Switch Circuit".
Patent Abstracts of Japan, vol. 10, No. 50(E-384) {2107}, Feb. 27, 1986, & JP-A-60-201795, T. Yano, et al., "MOS Digital Space Switch Circuit".
IBM Technical Disclosure Bulletin, vol. 28, No. 3, Aug. 1985, pp. 1302–1303, "CMOS Self-Decoding Complementary Pass Gate Multiplexer".
Proceedings of the International Switching Symposium, May 7–11, 1984, Session 31-C, Paper 3, pp. 1–6, C. Duret, et al., "Integrated Crosspoint Technology For Wide Band Space Division Switching Networks".
Computer, vol. 20, No. 6, Jun. 1987, pp. 30–40, V. P. Kumar, et al., "Augmented Shuffle-Exchange Multistage Interconnection Networks".
IEEE J. on SAC, vol. SAC-4, No. 4, 1986, pp. 529–535 High-Speed Digital Switching Technology Using Space-Division-Switch LSI's H. Yamada, H. Kataoka, T. Sampei & T. Yano (NTT).
The 1987 70th Anniversary National Meeting of Electronic Information Communication Society 1842 "A Space Switch Configuration For A. Broadband Time-Division Switching Network" S. Hayano & K. Nagashima (NEC).
ISSCC88, P116, A 64×17 Non-Blocking Crosspoint Switch F. E. Barber, W. E. Werner, P. A. Wilford, T. R. Wik & R. J. Wozniak (ATT) Feb. 18, 1988.

Primary Examiner—Ulysses Weldon
Attorney, Agent, or Firm—Oblon, Spivak, McClelland, Maier & Neustadt

[57] ABSTRACT

A digital signal exchange equipment is disclosed which is constructed of a combination of selector modules each constituted by a plurality of gate arrays as a parallel unit in a column direction. The respective gate array comprises a first gate for selecting one line from an n number of first input lines and connecting it to an output line, a second gate for selecting one line from an output line of the first gate and one second input line and connecting it to the second gate and a flip-flop for waveshaping an output of the second gate and, at the same time, taking synchronization among the respective gate array. The selector module as set forth above is constructed of a semiconductor circuit device. When, in particular, a plurality of selector modules are combined together, they are arranged as a k-column/l-row array in which input bus lines are each connected to each common row and an n number of output lines are connected for each row to an n number of second input lines of the next-row selector module.

7 Claims, 7 Drawing Sheets

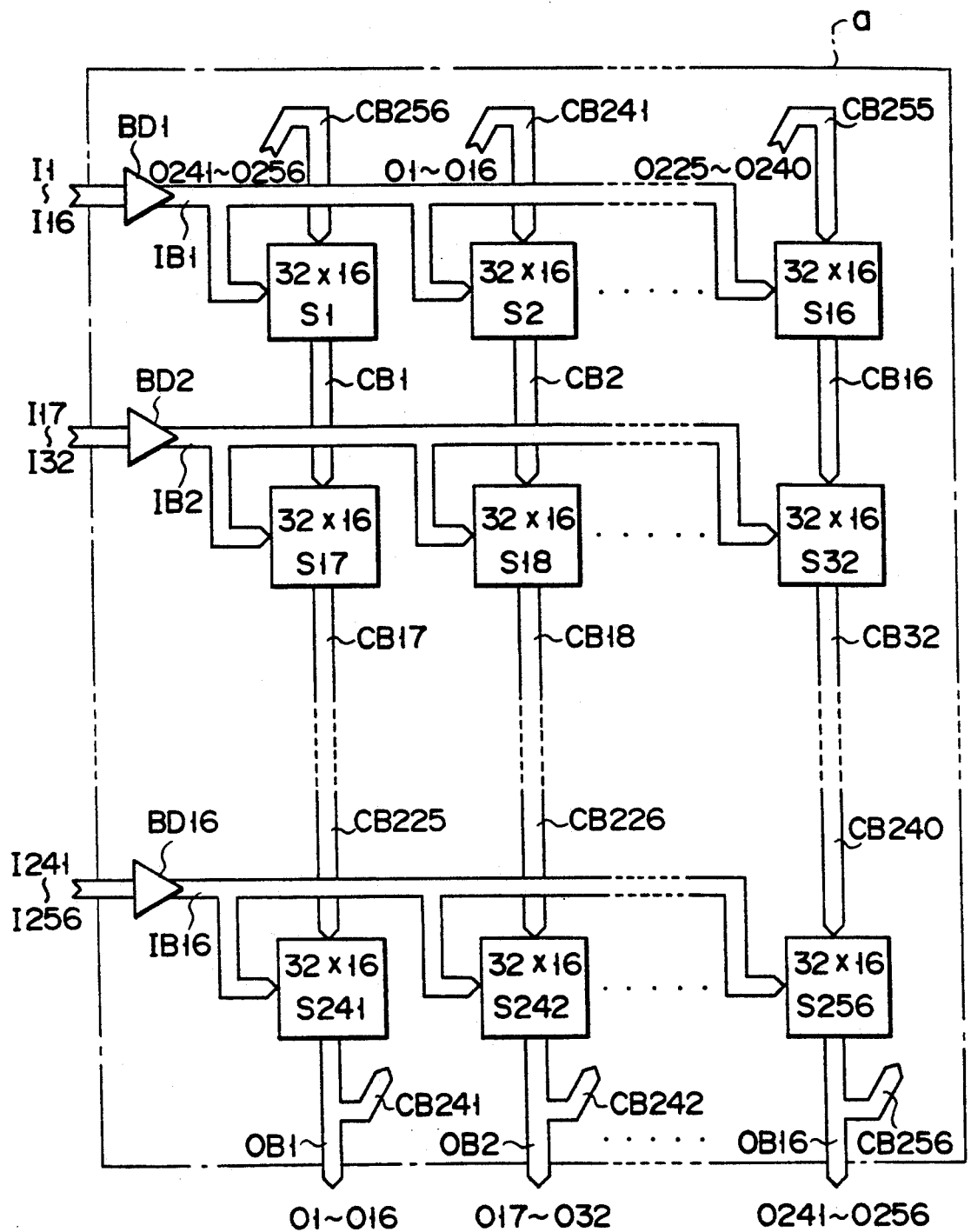
F I G. 1

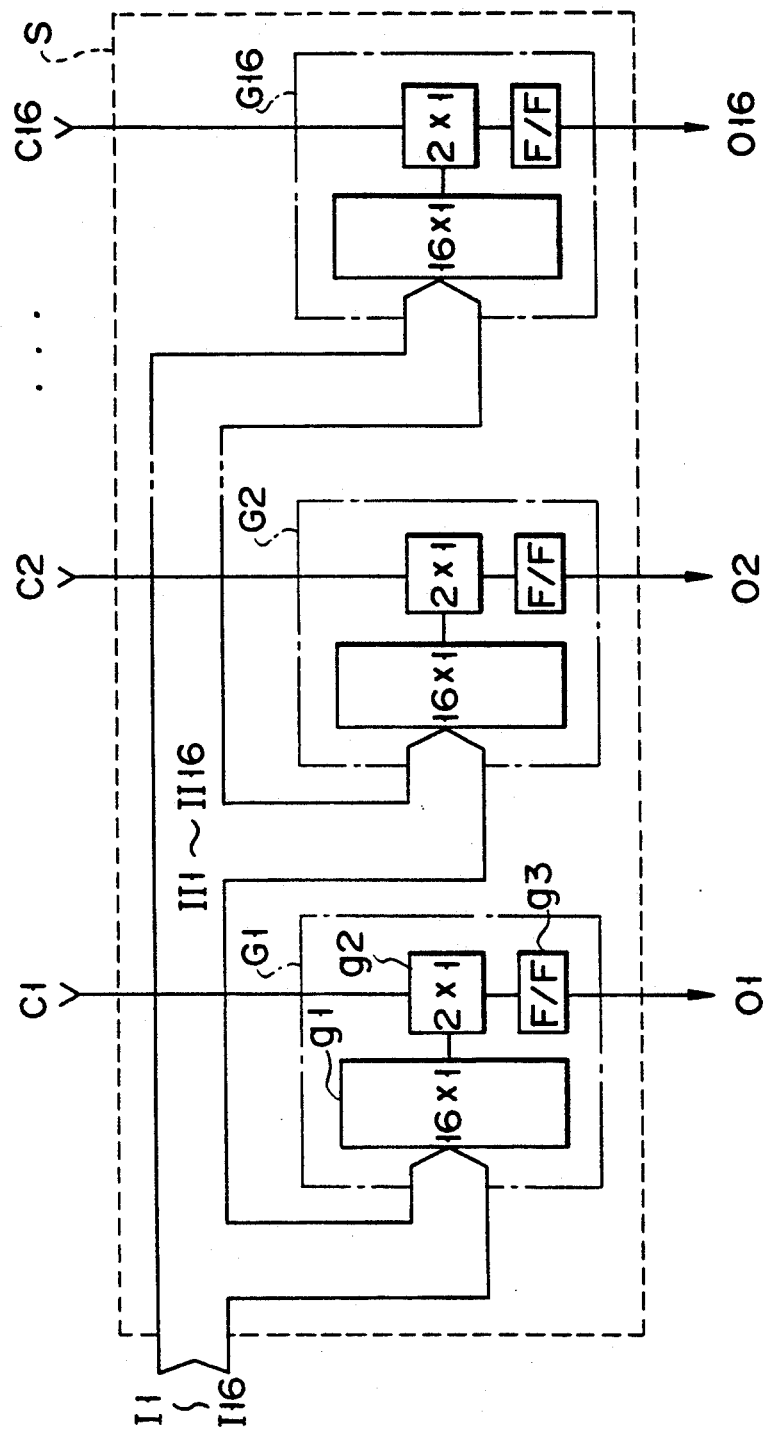
F I G. 4

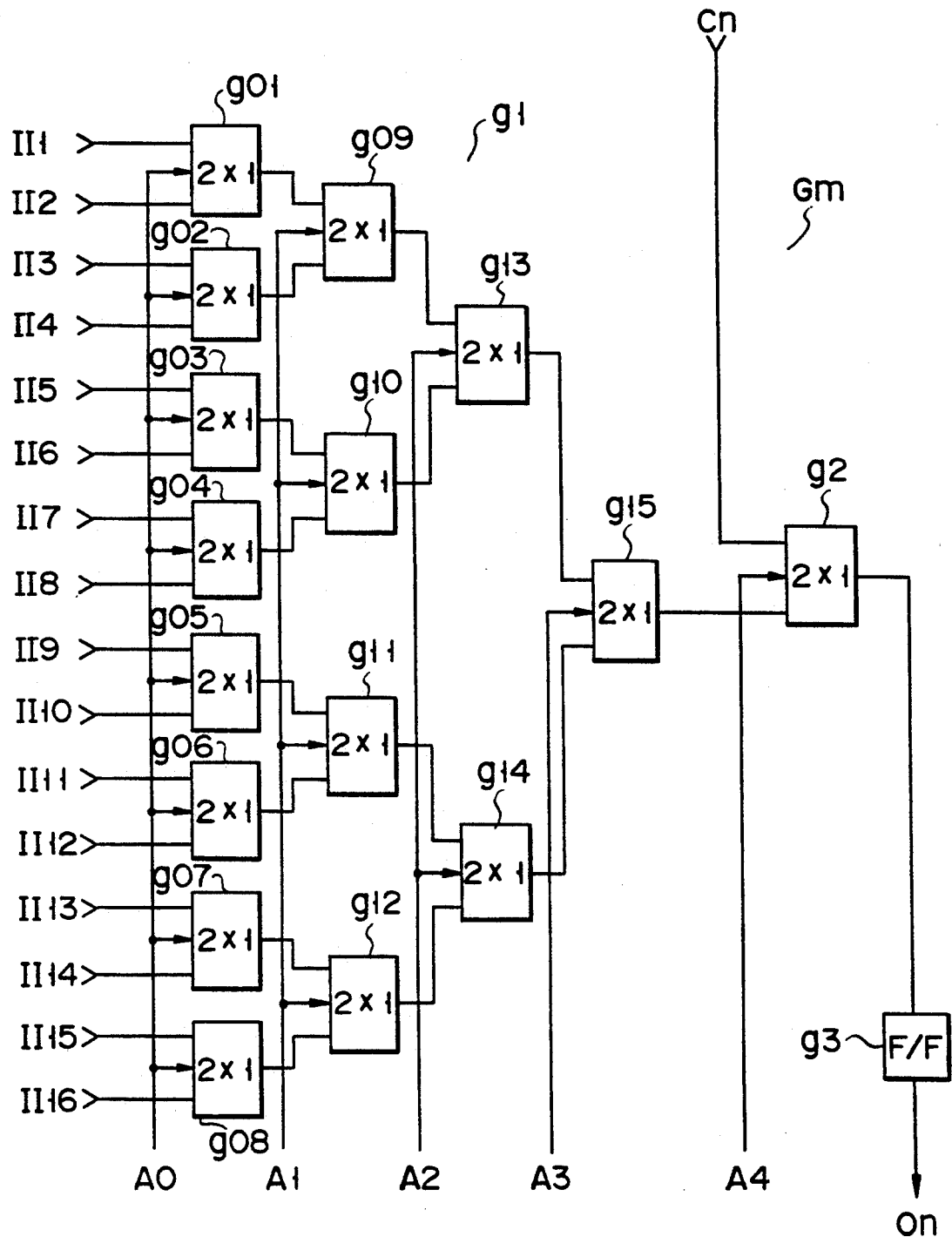
F I G. 5

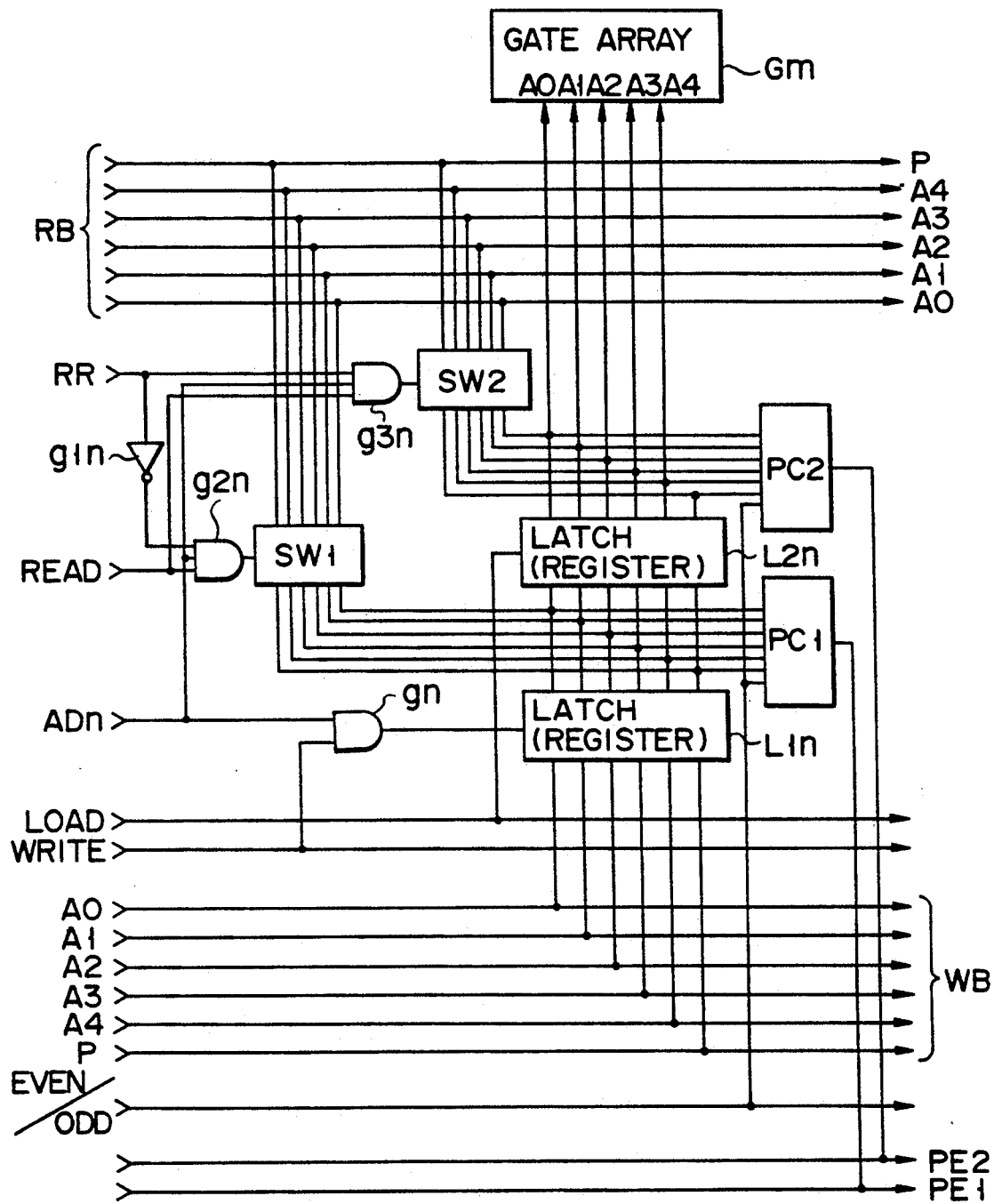
F I G. 8

DIGITAL SIGNAL EXCHANGE EQUIPMENT

This application is a continuation of U.S. patent application Ser. No. 07/793,508, filed on Nov. 18, 1991, now abandoned which is a continuation of U.S. patent application Ser. No. 07/353,769 filed on May 18, 1989, now abandoned.

BACKGROUND OF THE INVENTION

1. Field of the Invention

The present invention relates to a digital signal exchange equipment for connecting a plurality of digital signal input circuit lines to an arbitory circuit line of a plurality of output circuit lines and to a circuit line selection control apparatus for selectively controlling a circuit line connection and for preventing a connection error at an exchange time.

2. Description of the Related Art

In general, a digital signal exchange equipment for performing an exchange of a fast and continuous digital signal, such as an image PCM signal used, for example, at a broadcasting station comprises a matrix array of switching elements each provided at a crosspoint of each input line with a corresponding output line, or at a crosspoint of each output line with a corresponding input line, with the input and output lines connected to input and output circuit lines, respectively, as a lattice-like structure. In this matrix array, any input circuit line can be connected to any output circuit line by making a selective, switching connection to a predetermined switching element.

A matrix type unit for controlling a crosspoint connection by the switching element requires a very large number of switching elements with an increase in the circuit lines and, furthermore, the switching of the switching elements is very complex to control. Since, in this case, an input digital signal has to be passed through a great many of switching elements until it is output from the exchange equipment, it is not possible to, due to a high-speed requirement for a digital signal to be transferred, disregard a delay of that signal when it passes through the switching elements. As the switching elements, use may be made of electronic switches (semiconductor switches) in which case the signal passage characteristics of this type of switches are generally not equal in terms of the delay of a signal at a time of a rise and a fall. For this reason, the input digital signal suffers a deformation with respect to time, each time it passes through the switching element, so that it has a very great deformation. This causes a difficulty in a signal identification.

As a general countermeasure against this situation, a method may be adopted which achieves the synchronization and waveform-shaping of such digital signal by a flip-flop each time that signal passes through the switching element at the crosspoint. If, however, this method is applied to an exchange equipment having a simple matrix array as set forth above, a great number of flip-flops are required in the case where many circuit lines are involved. This system dissipates more electric power and is difficult to implement because of many flip-flops involved, failing to offer any practical countermeasure.

On the other hand, a circuit line selection control apparatus used in the conventional exchange equipment performs a selective switching among the many circuit lines in a time-division fashion and dynamically monitors the switching elements so that a connection error may be prevented. In the time-division exchange system, however, the select signal is multiplexed in a time-division fashion to conform to the characteristic of the digital signal transmitted and then input to the exchange equipment. In the treatment of a fast, continuous digital signal, such as an image PCM signal, the bit rate of the select signal after being multiplexed becomes an extremely high level. It is, therefore, not easy to implement such a system. The error connection preventing means works under dynamical control of the switching element, only after a switch connection has been achieved, and it is not preferable that it be employed for such a purpose.

As set forth above, the conventional digital signal exchange equipment involves a high-speed requirement for transmitted digital signals as well as an increase in a signal delay among the circuit lines resulting from a large increase in the number of circuit lines. It is thus difficult to meet the high-speed requirement for digital signals as well as an increase in the number of circuit lines. Since the conventional circuit selection switching apparatus performs a selective switching among circuit lines, it is not easy to achieve it as a practical apparatus due to an extremely high bit rate of the select signal. Indeed in spite of the dynamic monitoring of the switches, the apparatus works only after a switch connection is achieved, failing to be manufactured as a fully practical apparatus.

SUMMARY OF THE INVENTION

A first object of the present invention is to provide a digital signal exchange equipment which is simple in arrangement, easy in the control of a switching among circuit lines, uniform in a signal delay time among the circuit lines and can fully suppress deformation caused during a signal transmission whereby it is readily possible to achieve a high-speed requirement for transmitted digital signals as well as an increase in the number of the circuit lines.

A second object of the present invention is to provide a circuit line selection control apparatus which can readily and positively provide a protection against a circuit line connection error when the digital signal exchange equipment is implemented according to the first object of the present invention.

According to a first aspect of the present invention there is provided a selector module for a digital signal exchange equipment which is responsive to external select signals to switchingly connect an n number (n: a natural number) of input circuit lines to an m number (m: a natural number) of output circuit lines, which comprises:

an m number of basic selection circuits each comprising a first selection section provided for the respective output circuit line and responsive to the external select signals to select one from an n number of first input lines and to connect it to one output line and a second selection section adapted to select one line from the output line of the first selection section and one second input line and to connect it to one output line which is as an output circuit line; and an input bus commonly connecting the n number of first input lines of said m number of basic selection circuits to said n number of input circuit lines.

According to a second aspect of the present invention, there is provided a digital signal exchange equipment responsive to external select signals to switchingly connect a k×n (k, n: a natural number) number of input circuit lines to an l×m (l, m: a natural number) number of output circuit lines, which comprises:

a k×l number of selector modules each having an m number of basic selection circuits, responsive to said external select signals, for selecting one of an n number of first input lines and for selecting one line from the selected line and one second input line to connect it to one output line, and an input bus for making a common connection among the n number of first input lines of the respective basic selection circuit; and connecting means for connecting said selector modules as a k-column/l-row array, for connecting said selector modules to said input circuit lines which are divided into k units with those input circuit lines on each column as a respective unit, for connecting an m number of output lines to an m number of second input lines, for each row, of the next row selector module and for connecting an m number of output lines on a last column to said output circuit lines which ar divided into l units.

According to a third aspect of the present invention, there is provided a digital signal exchange equipment according to claim, further comprising control means provided within said basic selection circuit to allow the selection circuit to switchingly be controlled with j-bit (j: a natural number) select signals;

control signal generating means, responsive to external circuit line designation information, for generating the j-bit select signals, for generating a parity signal and for outputting both signals as a control signal;

a register for a control signal, provided for a corresponding basic selection circuit, for holding the control signal which is generated in said control signal generating means and for delivering a select signal which is held to a corresponding basic selection circuit;

a first parity calculation circuit, provided for the corresponding register, for receiving a control signal which is held in that register and performing a parity checking and for delivering a first parity error signal when an error is detected at a time of parity checking.

BRIEF DESCRIPTION OF THE DRAWINGS

FIGS. 1 to 6 are views showing a digital signal exchange equipment according to one embodiment of the present invention;

FIG. 1 is a block circuit diagram showing a whole circuit arrangement of the digital signal exchange equipment, excluding a control system;

FIG. 2 is a view showing a selector module of FIG. 1 and input/output signals for the selector module;

FIG. 3 is a block circuit diagram showing a detailed circuit of a gate array in the selector module shown in FIG. 2;

FIG. 4 is a block circuit diagram showing an inner circuit of the selector module of FIG. 2;

FIG. 5 is a logic circuit diagram showing a detailed arrangement of the gate array shown in FIG. 3;

FIG. 6 is a logic circuit diagram showing a 2×11 gate which is used for a gate array shown in FIG. 3;

FIGS. 7 to 9 are views showing a selection switching control apparatus according to another embodiment of the present invention;

FIG. 7 is a block circuit diagram showing a circuit arrangement of a control system of the selector module shown in FIG. 3;

FIG. 8 is a block circuit diagram showing a circuit arrangement of a checking circuit arrangement suitable for a control system of FIG. 7; and FIG. 9 is a logic circuit diagram showing an arrangement of a parity checking circuit arrangement of FIG. 8.

DETAILED DESCRIPTION OF THE PREFERRED EMBODIMENTS

Figure 2:
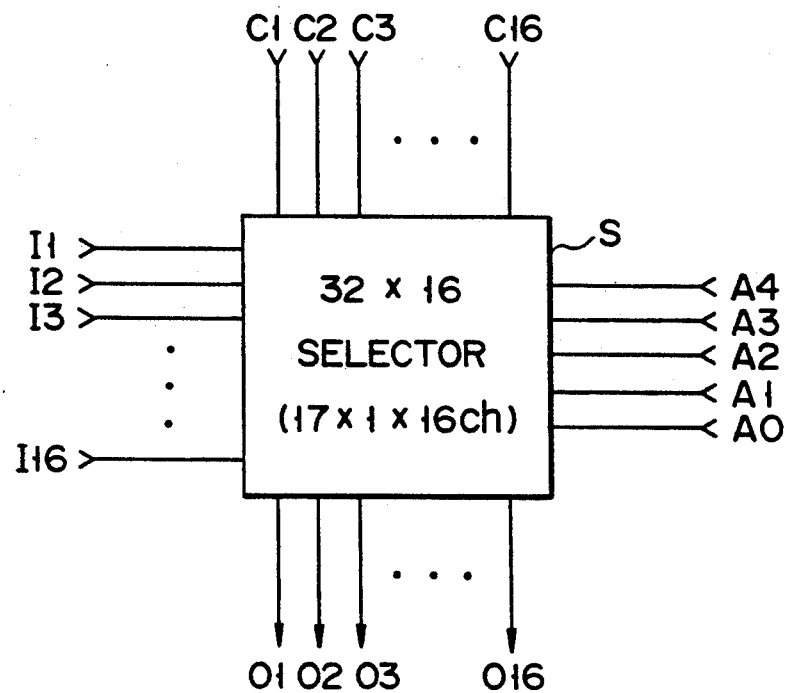

An embodiment of the present invention will be explained below with reference to the accompanying drawings.

First, a digital signal exchange equipment according to one embodiment of the present invention will be explained below with reference to FIGS. 1 to 6.

FIG. 1 shows a whole arrangement of a 16×16-input/16×16-output type digital signal exchange equipment according to the present invention, noting that, here, a control system is omitted.

In the arrangement shown in FIG. 1, $S_1$ to $S_{256}$ denote selector modules which constitute a 32-input/16-output (hereinafter referred as 32×16) type IC device having 16 inputs in a column direction and 16 inputs in a row direction. The IC device is formed, as a 16-column×16-row array, on a substrate a. $IB_1$ to $IB_{16}$ show internal input buses which are provided to correspond to respective 16 circuit lines of 16×16 circuit lines of external input terminals, not shown. Digital signals which are input to external input terminals of respective 16 circuit lines are transmitted, respectively through bus drivers $BD_1$ to $DB_{16}$, to 16 selector modules $S_1$ to $S_{16}$, $S_{17}$ to $S_{32}$, ..., $S_{241}$ to $S_{256}$ on respective columns.

$CB_1$ to $CB_{240}$ denote internal common buses and transmit 16 outputs of selector modules $S_l$ to $S_{16l}$ on a l-th column to 16 inputs of selector modules $S_{l+1}$ to $S_{16(l+1)}$ on an (l+1)th column, noting that l denotes a natural number of 1 to 15. $CB_{241}$ to $CB_{256}$ are internal common buses and transmits 16 outputs of the selector modules $S_{241}$ to $S_{256}$ on the 16-th column to 16 inputs of selector modules $S_2$ to $S_{16}$ on the next column, noting that $CB_{256}$ denotes an initial row. $OB_1$ to $OB_{16}$ are internal output buses and transmit 16 outputs of selector modules $S_{241}$ to $S_{256}$ on the column to corresponding external output terminals, not shown, of 16×16 circuit lines.

An interface for control signal inputting/outputting, as well as a control bus for making a connection between the interface and the respective selector modules $S_1$ to $S_{256}$, is provided on the substrate a, though not shown in FIG. 1. The interface is connected to a host computer, not shown, and the respective selector modules $S_1$ to $S_{256}$ are selectively controlled by the host computer.

That is, in the digital signal exchange equipment so arranged, the digital signal inputs $I_1$ to $I_{256}$ 16×16 circuit lines are divided into 16 sections and are connected respectively through buffer drivers $BD_1$ to $BD_{16}$ to the internal input buses $IB_1$ to $IB_{16}$. The input digital signals of the internal input buses $IB_1$ to $IB_{16}$ are transmitted to the selector modules $S_1$ to $S_{16}$, $S_{17}$ to $S_{32}$, ..., $S_{241}$ to $S_{256}$.

The respective selector modules $S_1$, ..., $S_{256}$ are arranged such that the input lines on the respective column are connected, in an normal state, to the corresponding output lines on the same column. When the input and output lines on the column are designated by a control signal which is input via the control bus, the corresponding designated lines are selected for connection. A digital signal on the output line of a column is output to an outside via the internal output bus line of the same column, unless the first-mentioned line is selected by the other selector.

FIG. 2 shows a detail of the 32×16 selector modules S wherein $I_1$ to $I_{16}$, $C_1$ to $C_{16}$, $O_1$ to $O_{16}$, and $A_0$ to $A_4$ denote internal input bus lines, internal common bus lines, internal output bus lines, and control bus lines, respectively. The selector modules S is of such a type that gate arrays Gm (m=1 to 16) as shown in FIG. 3 are constructed of a parallel array of 16 gates on the column as shown in FIG. 4 where the input terminals of the respective gate arrays are connected to the internal input bus lines $I_1$ to $I_{16}$ via input bus lines $II_1$ to $II_{16}$ in the selector module S.

Figure 3:
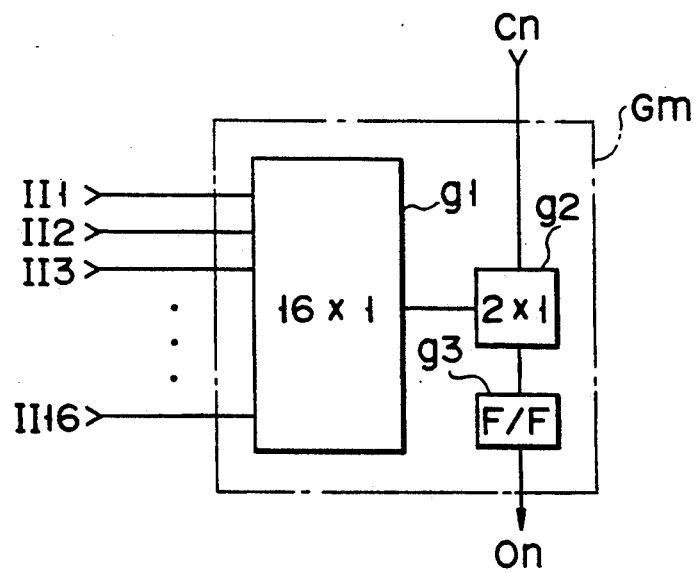

As shown in FIG. 3, the gate array Gm comprises a first 16×1 gate g1 for selecting one of the input bus lines $II_1$ to $II_{16}$, a second 2×1 gate g2 for selecting one of an output line of the first gate g1 and internal common bus line Cn (n: a natural number of 1 to 16) and connecting it to the internal output bus line On, and a timing circuit g3 constructed of a flip-flop (F/F) and adapted to obtain a coincidence output timing among the respective arrays $G_1$ to $G_{16}$.

The detailed arrangement of the gate array Gm will be explained below with reference to FIG. 5. The first 16×1 gate g1 constitutes a tree-like array of 2×1 gates g01 to g15 with eight 2×1 gates g01 to g08 at a first stage, four 2×1 g09 to g12 at a second stage, two 2×1 gates g13 and g14 at a third stage and one 2×1 gate g15 at a fourth stage. The respective gates g01 to g08, g09 to g12, g13 to g14 and g15 are selectively controlled by select signals $A_0$, $A_1$, $A_2$ and $A_4$, respectively.

Of the input bus lines $II_1$ to $II_{16}$ connected to the first gate g1, eight lines are selected by the gates g01 to g08 at the first gate, four lines are selected by the gates g09 to g12 at the second gate, two lines are selected at the third gates g13 and g14 and one line is selected by the gate g15 at the fourth gate. In this way, the output of the first gate g1 is connected to the input of the second 2×1 gate g2.

Here, the respective gates g01 to g15 are so constructed that, for example, the upper lines are selected when a select signal is "0" and the lower lines in FIG. 5 are selected when the select signal is "1". In order to select an input bus line $II_n$, it is only necessary that a value of $(n-1)_2$ in binary notation be applied to the select signal of the control bus lines $A_0$ to $A_3$. If, for example, $II_{07}$ is to be selected, it is only necessary to put a select signal $(A_3A_2A_1A_0)_2$ as $(0110)_2$ $(=(7-1)_{10})$. It is thus easy to set any select signal by establishing the aforementioned relation.

The second gate g2 is controlled by a select signal coming from the control bus lines $A_4$ and selects an output line of the first gate g1 when $A_4$="1" and an internal common bus line Cn when $A_4$="0".

Figure 6:
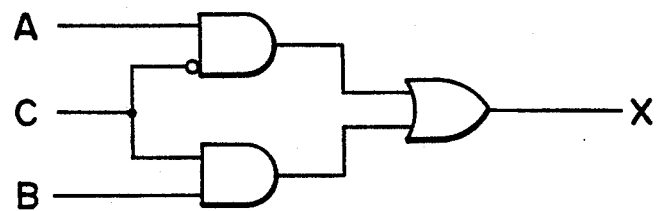

The 2×1 gates g01 to g15 and g2 can be implemented by a logic circuit as shown in FIG. 6. In an arrangement shown in FIG. 6, A, B denote a digital signal input line; C, a control signal input line; and X, a digital signal output line. The aforementioned logic circuit implements $$X=(A\cdot\overline{C})+(B\cdot C).$$

That is, A is selected at an AND gate AND1 when C=0 an B is selected at an AND gate AND2 when C=1 in which case the selected signal is taken out as X via an OR gate OR.

If, as set forth above, the gate array Gm is constructed with the 2×1 gate as a fundamental element, the input signal can pass through the gates with an equal number of gate passages to obtain ready synchronization and ready selection control can be achieved with 5-bit select signals ($A_0$ to $A_4$).

Figure 7:
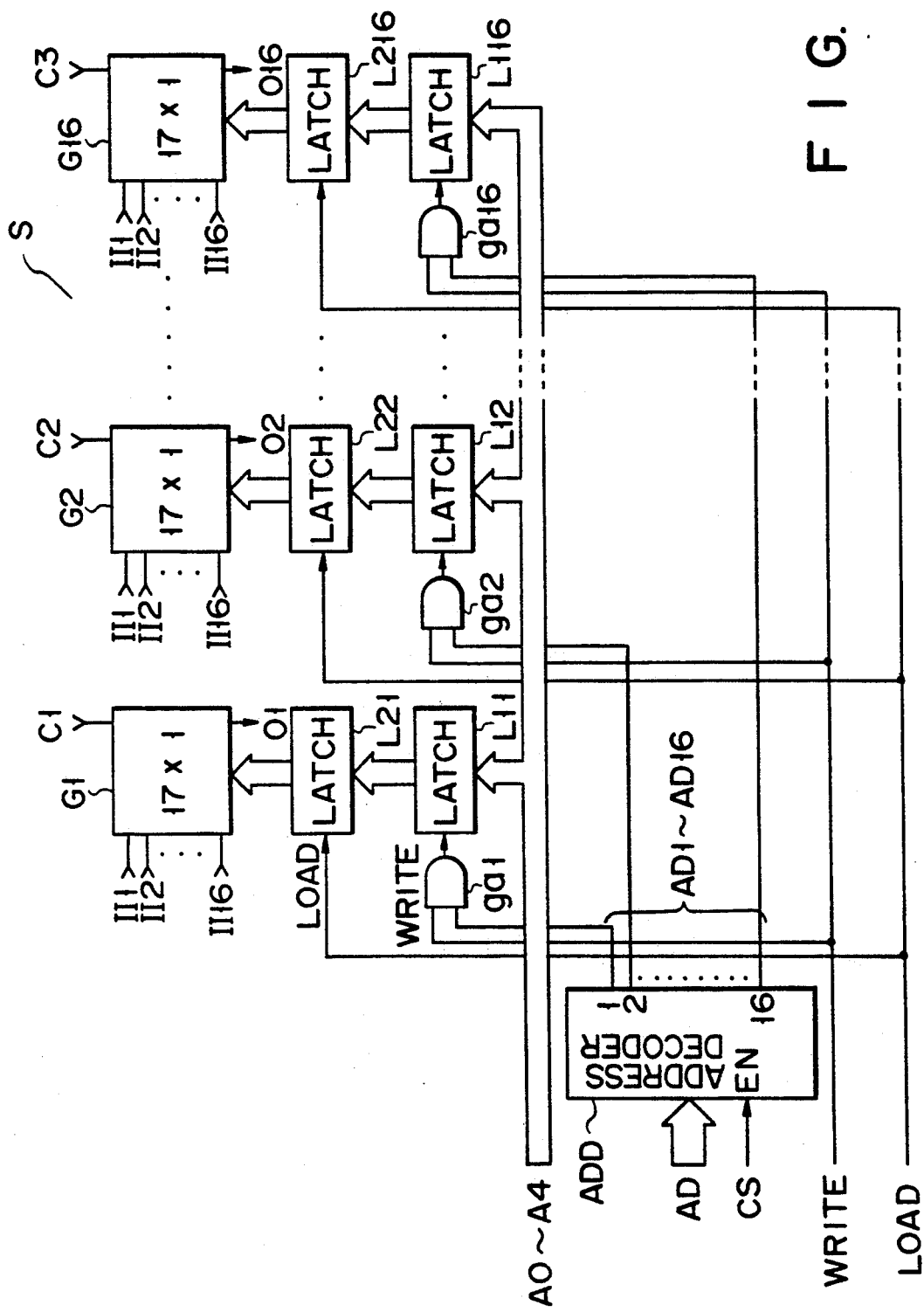

FIG. 7 shows an arrangement of a control system for the aforementioned selector modules S. A control bus which is connected to the module S is constituted by the aforementioned five-bit select signal ($A_0$ to $A_4$), 4-bit address data AD, chip select signal cs, write instruction signal WRITE and load instruction signal LOAD.

On the other hand, a control system comprises, for the respective gate array Gm, first and second latch circuits L1n and L2n and AND gates gan and address decoder ADD.

A bus line of a 4-bit address data AD and chip select signal cs is connected to the address decoder ADD, and a bus line of an n channel output ADn of the address decoder ADD and write instruction signal WRITE is connected to the AND gate gan. The 5-bit bus line of the select signals $A_0$ to $A_4$ and output line of the AND gate gan are connected to the first latch circuit L1n; the 5-bit output line of the first latch circuit L1n and a bus line of a load instruction signal LOAD are connected to a second latch circuit L2n; and a 5-bit output terminal of the second latch circuit L2n is connected to a control bus of the respective gate array Gm.

That is, the aforementioned address decoder ADD is initiated upon receipt of a chip select signal cs and receives the 4-bit address data AD to identify which gate array Gm is designated, and transmits a designation signal ADn to the AND gate gan of the designated gate array Gm.

Upon receipt of the designated signal ADn, the AND gate gan supplies a write instruction signal WRITE to the first latch circuit L1n. The first latch circuit L1n receives the select signals $A_0$ to $A_4$. When it receives a write instruction signal WRITE, and holds them until it receives the next write instruction signal WRITE. Upon receipt of a load instruction signal LOAD, the second latch circuit L2n receives a latch output of the first latch circuit L1n and transmits it to the gate array Gm until the next instruction signal LOAD is received. By so doing, it is possible to make the first latch circuit L1n in a "freely writable" state and hold the next select signal for the respective gate array Gm.

The digital signal exchange equipment thus arranged includes a combination of IC selector modules and can readily cope with an increase in their circuit lines. Furthermore, the exchange equipment allows the use of a simpler control system since it is possible to perform control per module. At the same time, since the respective modules are switchingly controlled by the output of the latch circuit and since the synchronization, as well as the shaping of a waveform, is achieved by the flip-flop circuit in the respective module, a circuit-to-circuit delay time becomes uniform and any possible deformation as generated during a signal transmission can be reduced to a satisfactory extent. As a result, adequate preparation can readily be made for the use of a high-speed digital signal as well as an increase in the circuit lines.

In the digital signal exchange equipment, there is a possibility that if an error signal is latched to the first and second latch circuit L1n and L2n due to some cause, such as a noise, a connection error will arise relative to the input and output circuit lines in the selector modules S. As a general way of monitoring such a connection error, use may be made of a scanning system which sequentially reads "held data" out of the control register (latch circuits L1n, L2n) in the respective module and ascertains whether or not normal control data is stored. Since, in this scanning system, the number of control registers for storing control information is increased with an increase in the size of the signal exchange equipment, a lot of time is taken to read the information out of all the control registers in a sequence. It also takes a lot of time to respond to any abnormality, if any. A checking mechanism is, therefore, required to ascertain whether or not a correct select signal is latched to the latch circuit (L1n, L2n), that is the control register.

FIG. 8 shows an arrangement of a checking circuit arrangement for the circuit line selection control apparatus of the present invention which is provided to meet the aforementioned need. The checking circuit arrangement is provided for the respective gate array Gm. In the arrangement shown in FIG. 8, identical reference numerals are employed to designate parts or elements corresponding to those shown in FIG. 7 and different parts or sections will be explained below.

To the aforementioned control bus are connected bus lines of a parity signal P, even/odd designation signal EVEN/ODD, read instruction signal READ and read switching signal RR, 6-line read output bus RB and write output bus WB ($A_0$ to $A_4$, P control bus lines) and bus lines for parity error signals $PE_1$, $PE_2$. The read output bus RB, write output bus WB and respective buses of the parity error signals $PE_1$, $PE_2$ are connected via their interface to an external host computer. In this connection, it is to be noted that the read output bus RB and write output bus WB may be provided as a single shared bus because a write and a read operation are not performed simultaneously.

A 6-bit register is employed for the first and second latch circuits L1n and L2n. The first latch circuit L1n receives a write instruction signal from an AND gate gn and holds not only select signals $A_0$ to $A_4$ but also a parity signal P. The held signals $A_0$ to $A_4$ and P are output to a second latch L2n, first parity check circuit $PC_1$ and switch circuit $SW_1$. Upon receipt of a load instruction signal LOAD, the second latch circuit L2n supplies the output signals $A_0$ to $A_4$, P to the first latch circuit L1n to the second parity check circuit $PC_2$ and second read switch circuit $SW_2$, and only select signals $A_0$ to $A_4$ are fed to a gate array Gm.

Figure 9:
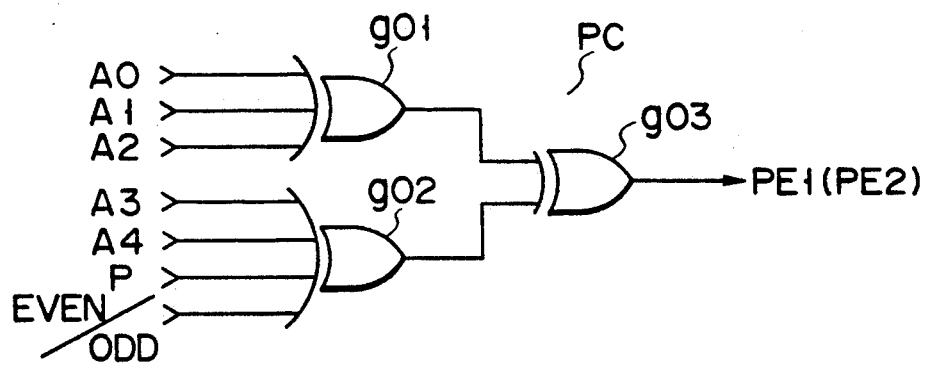

The first and second parity circuits $PC_1$ to $PC_2$ are of the same type and are constructed as shown, for example, in FIG. 9. In the arrangement shown in FIG. 9, g01 to g03 denote exclusive OR gates (hereinafter referred to as EX-OR gates) in which case signals $A_0$ to $A_2$ are supplied to the gate g01, signals $A_3$, $A_4$, P and EVEN/ODD are supplied to the gate g02 and the outputs of the gates g01 and g02 are supplied to the gate 03. In FIG. 9, the EX-OR gates g01 and g02 are indicated as having three and four inputs, respectively, showing that the 2-input EX-OR gates are multi-connected to obtain the gates g01 and g02.

The even/odd designation signal EVEN/ODD determines whether a parity signal is set as an even parity or an odd parity. The parity signal P is determined based on the even/odd designation signal EVEN/ODD. For example, at $A_0$ to $A_4$="00101" and EVEN/ODD=1, a parity signal P becomes "0". If the output $PE_1$ (or $PE_2$) of the EX-OR gate g03 becomes "1", an error is detected and a detected output is supplied to a host computer via the bus line ($PE_1$, $PE_2$).

The read instruction signal READ and read switching signal RR select the first and second read switch circuits $SW_1$ and $SW_2$ via the gates g1n to g3n, and the outputs of the switch circuits $SW_1$ and $SW_2$ are fed to the read output bus RB. For example, at READ="1" and RR="0", the outputs of the gates g1n, g2n and g3n become "1", "1" and "0", respectively, turning the first read switch circuit $SW_1$ ON and the second read switch $SW_2$ OFF. The outputs $A_0$ to $A_4$, P of the first latch circuit L1n are read onto the output bus RB. When RR=1, the outputs of the gates g1n, g2n and g3n become "0", "0" and "1", respectively, turning the first read switch circuit $SW_1$ OFF and the second read switch circuit $SW_2$ ON. The outputs $A_0$ to $A_4$, P of the second latch circuit L2n are read onto the output bus RB.

That is, in the aforementioned control system, the select signals $A_0$ to $A_4$ and parity signal are sent to the latch circuit L1n and L2n. The respective outputs of the latch circuits L1n and L2n are parity-checked and, if an error occurs, error signals $PE_1$, $PE_2$ are sent to the host computer. It is thus possible to immediately ascertains whether or not right select signals are held in the respective latch circuits L1n and L2n and to, if an error occurs, implement an interrupt processing for data preservation to be made by the host computer. Upon receipt of the read instruction signal READ and read switching signal RR, the first and second latch circuits L1n and L2n send the respective outputs $A_0$ to $A_4$, P to the read output bus RB as set forth above and from there onto the host computer. By so doing, the host computer can sequentially monitor the memory contents in all of the latch circuits, thereby largely reducing a response time from the generation of an error to a corresponding action to be taken.

Thus the circuit line selection switching control apparatus having the aforementioned checking circuit arrangement ca readily and positively provide a protection against a connection error between the circuit lines.

What is claimed is:

1. A selector module for a digital signal exchange equipment comprising:
    an m number (m: a natural number) of basic selection circuits each comprising a first selection section for selecting a line designated by a first selection signal from an n number (n: a natural number) of first input lines, and a second selection section for selecting a line designated by a second selection signal from the line selected by said first selection section and a second input line and connecting the selected line to an output line;
    an internal input bus for supplying a digital signal of n channels to all of said n number of first input lines of said m number of basic selection circuits; and
    selection signal distributing means for designating the selection states of said first and second selections of each of said basic selection circuits.

2. The selector module according to claim 1, wherein said m number of basic selection circuits each have synchronizing means for obtaining synchronization among the respective digital signal which is transmitted to the respective output line.

3. The selector module according to claim 2, further comprises a plurality of flip-flops each disposed at each output line said m number of basic selection circuits, each flip-flop being driven in synchronism with one another by virtue of being supplied the same clock signal.

4. The selector module according to claim 1, wherein said first selection section of said basic selection circuit is constructed of a combination of 2-input/1-output selection elements; and said section selection portion consists of 2-input/1-output selection elements so that an input signal passes through each of the gates of the basic selection circuit for an equal number of times.

5. The selector module according to claim 1, which is constructed of an integrated circuit device.

6. A digital signal exchange equipment comprising:

a k×l (k, l: a natural number) number of selector modules arranged as a k-columns/l-rows array, each of said selector modules comprising:

m number (m: a natural number) of basic selection circuits each comprising a first selection section for selecting a line designated by a first selection signal from an n number (n: natural number) of first input lines, and a second selection section for selecting a line designated by a second selection signal from the line selected by said first selection section and a second input line and connecting the selected line to an output line;

an internal input bus for supplying a digital signal of n channels to said n number of first input lines all of said m number of basic selection circuits; and selection signal distributing means for designating the selection states of said first and second selection sections of said basic selection circuit;

a k number of input buses each constituted by n number of lines, said input buses respectively provided for the columns of said selector modules, for supplying a digital signal of n channels to all of said internal input buses of the selector modules in a column;

a k×l number of extended buses, each of which is constituted by m number of lines and connects m number of output lines of the selector modules in a column to the second input line of the selector module of the next column in the same row, m number of output lines of the selector modules in the final column to the second input line of the selector module in the first column of the next row, and m number of output lines of the selector module in the final column of the final row to the second input line of the selector module in the first column of the first row;

selection signal generating section for designating a basic selection circuit of a selector module and generating the first and second selection signals for the first and second selecting section; and selection signal transmitting means for transmitting the selection signal to the designated selector module.

7. A digital signal exchange equipment according to claim 6, wherein each of said selector modules further comprises:

control signal generating means for generating a parity bit signal with respect to a bit signal constituted by the first and second selection signals during a distributing operation by said selection signal distributing means, and outputting the parity bit signal along with the first and second selection signals as a control signal;

an m number of first latch circuits, provided for said m number of basic selection circuits, for latching the first and second selection signals distributed to the designated basic selection circuit by said selection signal distributing means; and an m number of second latch circuits provided for said m number of first latch circuits, each of said second latch circuits latches the first and second selection signals supplied from the corresponding first latch means at the same time another second latch circuits latches these signals and transmits them tot he corresponding basic selection circuit;

an m number of first parity calculation circuits for receiving a control signal from said first latch circuit and performing a parity checking of the first and second selection signals on the basis of the parity bit signal and transmitting a parity error signal when an error is detected during the parity checking; and an m number of second parity calculation circuits for receiving a control signal from said second latch circuit and performing a parity checking of the first and second selection signals on the basis of the parity bit signal and transmitting a parity error signal when an error is detected during the parity checking, and said selection signal generating means receive the parity error signal supplied form said first and second parity calculation circuits of said selector modules and retransmit a selection signal to the corresponding basic selection circuit.

* * * * *